United States Patent
Elcock et al.

(10) Patent No.: US 11,671,647 B2
(45) Date of Patent: Jun. 6, 2023

(54) SYSTEM AND METHOD FOR AUDIO CONTROL OF CONCURRENTLY DISPLAYED VIDEO PROGRAMS

(71) Applicant: ARRIS ENTERPRISES LLC, Suwanee, GA (US)

(72) Inventors: Albert Fitzgerald Elcock, West Chester, PA (US); Anthony Zuyderhoff, Berks (GB); Richard Moore, Jr., Horsham, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 59 days.

(21) Appl. No.: 17/482,644

(22) Filed: Sep. 23, 2021

(65) Prior Publication Data

US 2022/0109904 A1     Apr. 7, 2022

Related U.S. Application Data

(60) Provisional application No. 63/088,081, filed on Oct. 6, 2020.

(51) Int. Cl.
| | | |
|---|---|---|
| *H04N 21/422* | (2011.01) | |
| *H04N 21/439* | (2011.01) | |
| *H04N 21/4223* | (2011.01) | |
| *H04N 5/45* | (2011.01) | |
| *H04N 21/485* | (2011.01) | |

(52) U.S. Cl.
CPC ......... *H04N 21/42222* (2013.01); *H04N 5/45* (2013.01); *H04N 21/4223* (2013.01); *H04N 21/42221* (2013.01); *H04N 21/4396* (2013.01); *H04N 21/4852* (2013.01)

(58) Field of Classification Search
CPC ....... H04N 21/42222; H04N 21/42221; H04N 21/4223; H04N 21/4396; H04N 21/4852; H04N 21/4856; H04N 21/4858; H04N 5/45; H04N 5/225
USPC ........................................................ 348/734
See application file for complete search history.

(56) References Cited

U.S. PATENT DOCUMENTS

| | | | |
|---|---|---|---|
| 2002/0097984 A1* | 7/2002 | Abecassis | H04N 21/4542 |
| | | | 348/E7.071 |
| 2002/0140862 A1 | 10/2002 | Dimitrova et al. | |
| 2007/0047901 A1* | 3/2007 | Ando | H04N 9/8042 |
| 2007/0067800 A1* | 3/2007 | Wachtfogel | G11B 27/34 |
| | | | 386/E5.07 |
| 2008/0172693 A1* | 7/2008 | Ludvig | H04N 21/4438 |
| | | | 348/E7.071 |

(Continued)

OTHER PUBLICATIONS

International Search Report and Written Opinion for Application No. PCT/US2021/051642 dated Dec. 16, 2021.

*Primary Examiner* — John W Miller
*Assistant Examiner* — Sean N. Haiem
(74) *Attorney, Agent, or Firm* — Panitch Schwarze Belisario & Nadel LLC

(57) ABSTRACT

A system and method for enabling the selection of audio associated with one or more concurrently displayed video programs to be controlled. This system and method enable a user to select one or more concurrently displayed video programs and consequently control the routing and volume of the audio associated with one or all of the concurrently displayed video programs. The concurrently viewed videos can be presented in a picture-in-picture format.

11 Claims, 3 Drawing Sheets

(56) References Cited

U.S. PATENT DOCUMENTS

| | | |
|---|---|---|
| 2015/0109205 A1 | 4/2015 | Han et al. |
| 2016/0278611 A1 | 9/2016 | Power |
| 2017/0026587 A1 | 1/2017 | Moberly |
| 2017/0048613 A1* | 2/2017 | Smus ................ H04M 1/72412 |
| 2019/0020918 A1 | 1/2019 | Quere et al. |
| 2019/0037267 A1* | 1/2019 | Gharaat ................ G06F 3/1454 |
| 2019/0342624 A1* | 11/2019 | Putterman .......... H04N 21/4316 |
| 2020/0346107 A1* | 11/2020 | Urbanus ................ A63F 13/52 |

* cited by examiner

SYSTEM AND METHOD FOR AUDIO CONTROL OF CONCURRENTLY DISPLAYED VIDEO PROGRAMS

CROSS-REFERENCE TO RELATED APPLICATION

This application claims the benefit of U.S. Provisional Patent Application 63/088,081, filed Oct. 6, 2020, which is incorporated by reference herein in its entirety.

BACKGROUND OF THE INVENTION

In today's media-rich environment it is not uncommon for an individual, or group of individuals, to simultaneously view multiple video programs. This can be accomplished by utilizing multiple individual screens, wherein each screen is dedicated to a single video program. However, using multiple screens can be both costly and cumbersome. A reasonable alternative is to employ a video appliance that supports presenting multiple video programs upon the same screen. This is typically accomplished with the multiple sources being presented in a picture-in-picture ("PIP") format (where one primary video program occupies the majority of the screen and one or more other programs are embedded as smaller "pictures" within the primary).

PIP presentation of multiple video programs is well-known in the video system art. Typically, one of the programs is designated as primary and only the audio associated of that primary program is played through the speaker or audio system associated with the video system. A user typically can designate a particular video source as primary using an interface such as a remote control. In a typical PIP format, when a particular video source is so designated, it is switched to occupy the largest portion of the screen and the associated audio with it is ported to an associated speaker or audio system.

Previous systems supporting the PIP presentation of multiple video programs failed to provide a user with the play audio associated with the non-primary video program(s). Although the limitation of only playing audio associated with a primary video program is acceptable for many use cases, there are situations where a user desires audio from a non-primary video program to be played instead of, or concurrently with that of the primary video program. Such use cases include video conferencing (where multiple participants, each in a separate video program, may need to heard from at the same time) or where multiple events are being watched. For example, if the primary video was a golf tournament and secondary video a football game. The user may consider golf to be best consumed on the larger format screen, while listening to the audio of the football game that is being presented as a PIP.

Accordingly, it would be desirable for a media system to provide a user with a system and method via which the preferred audio for a multiple picture format could be selected and controlled. Ideally, this system and method should provide the user with an easily manipulated interface.

BRIEF SUMMARY OF THE INVENTION

A system and method for enabling the selection of audio associated with one or more concurrently displayed video programs to be controlled. This system and method enable a user to select one or more concurrently displayed video programs and consequently control the routing and volume of the audio associated with one or all of the concurrently displayed video programs. The concurrently viewed videos can be presented in a picture-in-picture format.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
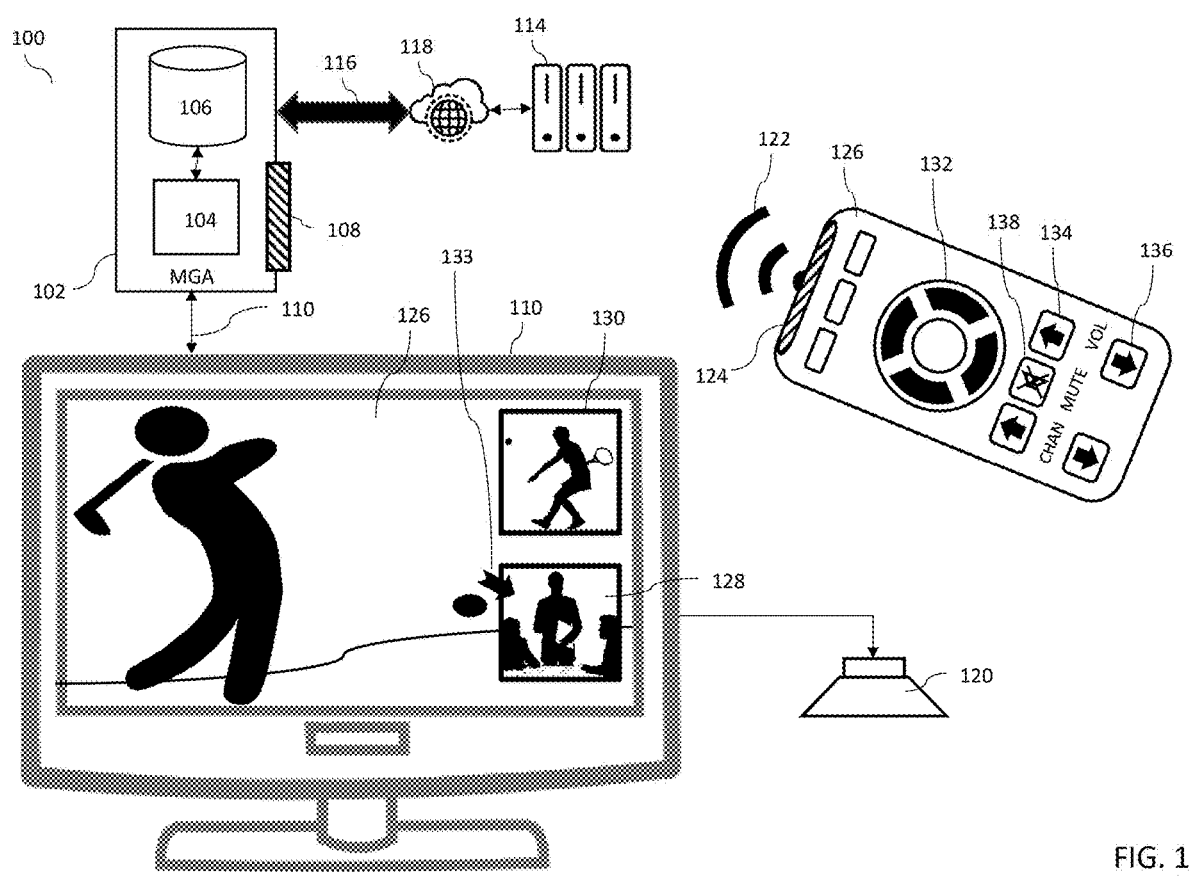
FIG. 1 is a is a functional block diagram of a first preferred embodiment of a system adapted to enable a user to select and control audio associated with multiple concurrently displayed video programs.

FIG. 1 is a functional diagram of a preferred embodiment of a system (100) adapted to concurrently display multiple video programs and enable user selection of one or more audio programs (each associated with one of the displayed video programs) to be played via the speaker or audio system of the screen or television displaying the multiple video programs. As shown, system 100 comprises media gateway appliance ("MGA") 102, which includes processor 104, memory 106 and wireless receiver 108. MGA 102 is also shown to be linked to digital television 110 (via HDMI cable 112) and linked to headend 114 via broadband link 116 and network 118). Television 108 is also shown to be coupled to audio system 120, which is adapted to reproduce audio associated with the video program or programs being displayed. Wireless receiver 108 is adapted to be responsive to wireless signals 122, radio-frequency (802.11 Wi-Fi, Bluetooth®, 802.15 ZigBee, etc.) or optical, produced by emitter 124 upon remote control 126.

MGA 102 functions as a primary appliance for the transmission, reception and presentation of digital video programs. These programs can include streaming and live video received from headend 114, as well as video programs stored in memory 106. MGA 102 is also adapted to permit the concurrent presentation of multiple video programs upon television 110 in the form of PIP displays presenting one video program as primary (full-screen) and one or more other videos as secondary (presented as reduced-size "pictures" superimposed upon the primary video). As shown in FIG. 1, MGA 102 is presenting primary video 126 (a golf tournament) as a full-screen video, and non-primary video programs 128 (a live meeting) and 130 (a tennis match). Processor 104 is programmed, as a default, to route the audio associated with the primary video program (golf tournament) to audio system 120, and to mute the audio associated with the non-primary video programs.

Processor 104 is also adapted to modify the audio being routed to audio system 120 in response to wireless signals transmitted from remote control 126 and received via wireless receiver 108. In particular, processor 104 detects if a user has actuated pointing device 132 to manipulate an on-screen cursor (133). Pointing device 132 can be pivoted forward, backward, left and right by a user to move the on-screen cursor. It can also be centrally depressed by a user to indicate the selection of the region of the screen upon which the on-screen cursor is visible. As shown in FIG. 1 the cursor has been manipulated so as to point to non-primary video program 128 (the live meeting). If, while on-screen cursor 132 is so positioned, if the user were to centrally depress pointing device 132, a wireless signal indicative of such would be generated by remote control 126 and received by wireless receiver 108. In response to the reception of this wireless signal, processor 104 determines that the user has chosen to select non-primary video 128 (see FIG. 2, steps 200 and 202).

Upon making this determination, processor 104 measures the duration of the interval over which the user continues to centrally depress pointing device 132. If the user discontinues centrally depressing pointing device 132 prior to the elapsing of a predetermined period, $t_{ALL}$ (a negative result for steps 204 and 206), processor 104 will route the audio associated with non-primary video program 128 to audio system 120 and mute the audio associated with all other concurrently displayed video programs (step 208). Processor 104 would also enable the audio controls on remote control 126 (volume up button 134, volume down button 136 and mute button 138) for adjustment of the audio associated with non-primary video program 128.

For the video programs depicted in FIG. 1, this would enable a user to view the golf tournament as a full-screen video, while hearing and controlling the audio associated with a live meeting (non-primary video program 128). The user could enjoy the full-screen viewing of the golf tournament while being able to monitor and even actively participate in the live meeting.

Figure 2:
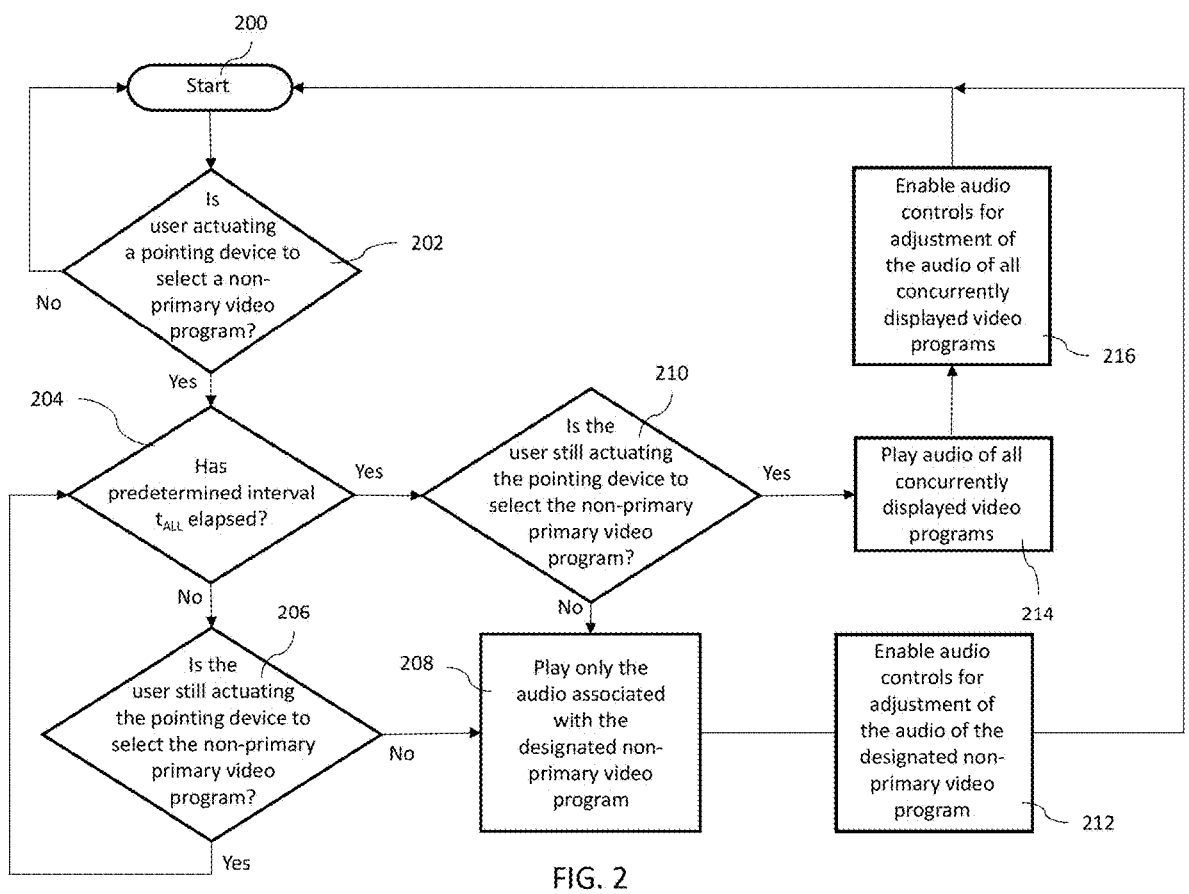
FIG. 2 is a flow diagram of a process for selecting which video-associated audio program(s) will be audible in the system of FIG. 1

However, as shown in FIG. 2, if in step 204 processor 104 determines that $t_{ALL}$ has elapsed (an affirmative result of step 204), and the user continues to centrally depress pointing device 132 (an affirmative result of step 210), processor 104 will route the audio of all concurrently displayed video programs for audio system 120. In addition, the audio controls on remote control 126 (134, 136 and 138) would be enabled to control the collective volume of the audio associated with all of the concurrently displayed video programs.

When the system has been enabled to concurrently adjust the volume levels of all displayed video programs it will be understood that the levels will be adjusted in a proportional manner. That is, if three programs were playing as depicted in FIG. 1, and the golf tournament had been at a particular volume, the tennis match at volume level that was approximately 80% of the volume of the golf tournament, and the meeting at a volume level of approximately 20% of the golf tournament volume, the relative volume levels would be remain unchanged. For example, if volume control 136 was utilized to lower the volumes by 20%, the golf tournament volume level would be at 80% of its previous level, the tennis match would be at 80% of its previous level (or a level equal to 64% of the original volume level of the golf tournament), and the volume level of the meeting would be at 80% of its previous level (or a level equal to 16% of the original volume level of the golf tournament).

Although concurrently playing audio from a golf tournament, a tennis match and a live meeting would most likely not be a mode that would prove advantageous, if each of the three video programs had been associated with participants in a live meeting, enabling the audio from all three video programs to be simultaneously played through audio system 120 would likely be a desirable state for system 100 to assume.

The interval $t_{ALL}$, the value of which can be stored in memory 106, would be fixed at a rather short duration, such as 1 second, so as not to require a user to centrally depress pointing device 132 for a lengthy period of time to indicate the selection of a particular video program. The duration of $t_{ALL}$ could be designated by a multiple service operator or specified by a user.

Figure 3:
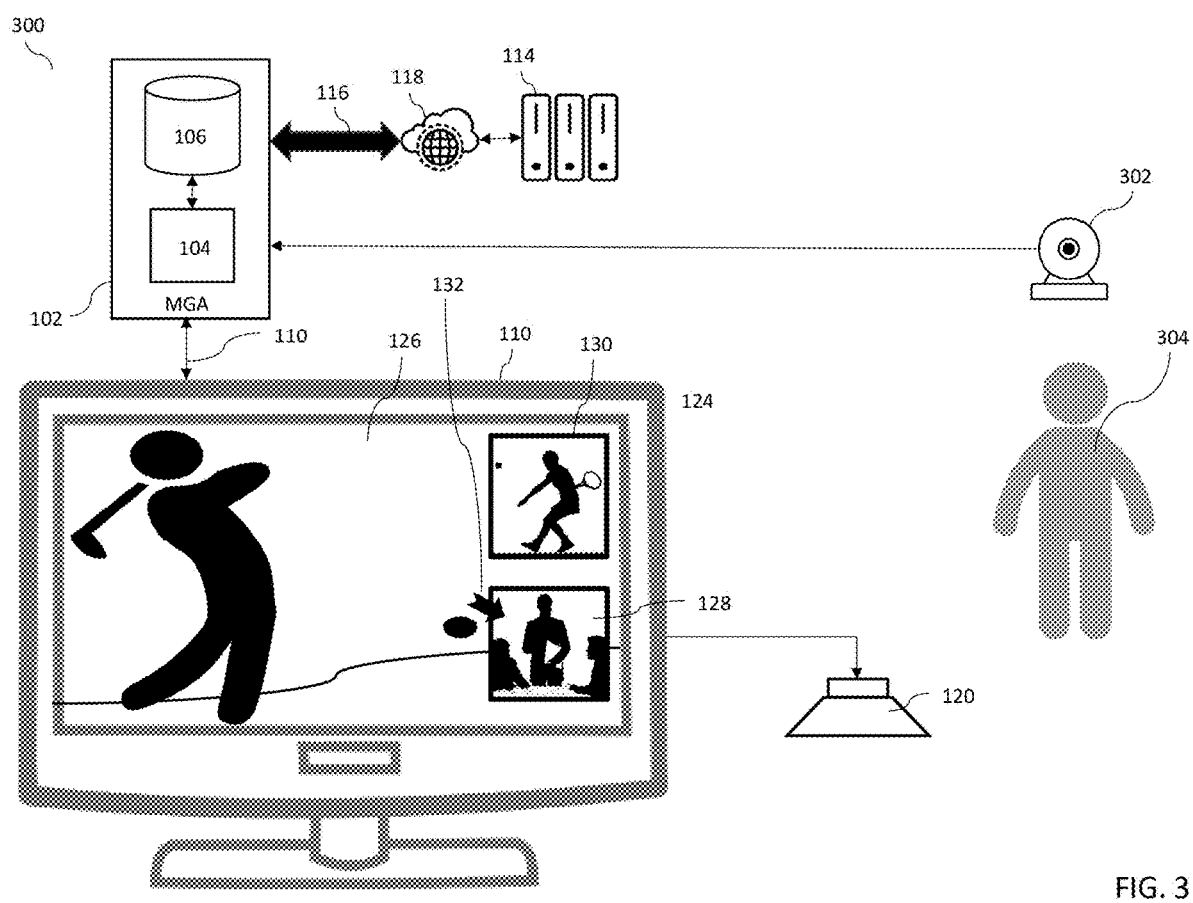
FIG. 3 is a is a functional block diagram of a second preferred embodiment of a system adapted to enable a user to select and control audio associated with multiple concurrently displayed video programs.

FIG. 3 provides a functional diagram of an alternate embodiment of the invention including a sensor (302), such as a camera, an infrared detector, or other motion sensor adapted to sense the motion of an individual (304) positioned to view video programs on television 110. Sensor 302 is particularly adapted to collect and transmit data indicative of hand motions made by individual 304 and transmit data representative of such to processor 104. Processor 104 is programmed to interpret certain hand motion data as corresponding to command instructions for the control of audio associated with concurrently displayed video programs. For example, data indicative of a user moving an open hand in a desired direction causes processor 104 to translate on-screen cursor 132 in a similar direction. A user could then make a distinctive motion to indicate the selection of the video program upon which the on-screen cursor was resting, such as closing their open hand to a fist (analogous to a user centrally depressing the pointing device in the previously described embodiment). The audio associated with the selected video program would be played by MGA 102. If a user held their hand in a fist for a time greater than $t_{ALL}$ the audio for all concurrently displayed video programs would be played.

Although the invention herein has been described with reference to particular embodiments, it is to be understood that these embodiments are merely illustrative of the principles and applications of the present invention. For example, the MGA can be a stand-alone device, or integrated into another system or device such as a television, a digital assistant, smartphone, tablet or a computer. The functionality of the MGA could also be provided by a system or systems that are no co-located with the television being utilized to display the video programs; this functionality could be linked to the television and or user via a network. In addition, the remote control utilized as a user interface could be supported by an application running on another device such as a computer, smartphone or tablet. The wireless receiver for receiving remote control commands could also be integrated into the television employed to display the video programs.

The invention claimed is:

1. A system for selecting and controlling the audio associated with one or more concurrently displayed video programs, the system comprising:
    a remote control having a user-actuated pointing device, and adapted to transmit at least one signal indicative of the actuation of the pointing device, wherein the at least one signal is representative of at least one user command;
    at least one media gateway appliance comprising at least one processor, wherein the at least one processor is adapted to:
        concurrently display at least two video programs upon a single display wherein one of the at least two video programs is displayed as a primary video, and at least one other of the at least two video programs is displayed as a secondary video superimposed upon a portion of the primary video;
        receive a first transmitted signal from the remote control indicative of user-actuation of the pointing device;
        generate, based at least in part upon the first transmitted signal, a first user command directing the positioning of an on-screen cursor to designated one of the at least two video programs;
receive a second transmitted signal from the remote control indicative of user-actuation of the pointing device;
generate, based at least in part upon the second transmitted signal, a second user command for selecting the designated one of the at least two video programs; and
determine, based at least in part upon the received second transmitted signal, if the at least one user-actuated pointing device has been actuated for a period of time in excess of a predetermined interval;
wherein, in response to a determination that at the least one user-actuated pointing device has not been actuated for a period of time in excess of the predetermined interval, the audio associated with the at least one selected video programs is played without altering the relative positions and displayed sizes of the at least two video programs upon the single display, and the audio associated with any non-selected video programs is muted; and
wherein, in response to a determination that at the least one user-actuated pointing device has been actuated for a period of time in excess of the predetermined interval, the audio associated with all video programs concurrently displayed on the single screen is concurrently played.

2. The system of claim 1 wherein the at least one processor is further adapted to receive at least one user command controlling the volume of the audio associated with the at least one selected video programs.

3. The system of claim 1 wherein the at least one gateway media appliance further comprises a wireless signal receiver adapted to receive wireless signals from the remote control indicative of user-actuation of the pointing device and communicate such to the at least one processor.

4. The system of claim 3 wherein the wireless signals comprise at least one of:
optical signals; and
radio-frequency signals.

5. The system of claim 1 wherein the at least one media gateway further comprises at least one memory adapted to store information defining the predetermined interval.

6. The system of claim 1 wherein the predetermined interval is approximately 1 second.

7. A method for selecting and controlling the audio associated with one or more concurrently displayed video programs, in a system comprising:
a remote control having a user-actuated pointing device, and adapted to transmit at least one signal indicative of the actuation of the pointing device, wherein the at least one signal is representative of at least one user command;
at least one media gateway appliance comprising at least one processor;

comprising the steps of:
concurrently displaying at least two video programs upon a single display wherein one of the at least two video programs is displayed as a primary video, and at least one other of the at least two video programs is displayed as a secondary video superimposed upon a portion of the primary video;
receiving a first transmitted signal from the remote control indicative of user-actuation of the pointing device;
generating, based at least in part upon the first transmitted signal, first user command directing the positioning of an on-screen cursor to designated one of the at least two video programs;
receiving a second transmitted signal from the remote control indicative of user-actuation of the pointing device;
generating, based at least in part upon the second transmitted signal, a second user command for selecting the designated one of the at least two video programs; and
determining, based at least in part upon the received second transmitted signal, if the at least one user-actuated pointing device has been actuated for a period of time in excess of a predetermined interval;
wherein, in response to a determination that at the least one user-actuated pointing device has not been actuated for a period of time in excess of the predetermined interval, the audio associated with the at least one selected video programs is played without altering the relative positions and displayed sizes of the at least two video programs upon the single display, and the audio associated with any non-selected video programs is muted; and
wherein, in response to a determination that at the least one user-actuated pointing device has been actuated for a period of time in excess of the predetermined interval, the audio associated with all video programs concurrently displayed on the single screen is concurrently played.

8. The method of claim 7 further comprising the step of:
receiving at least one user command controlling the volume of the audio associated with the at least one selected video programs.

9. The method of claim 7 wherein the at least one gateway media appliance further comprises a wireless signal receiver adapted to receive wireless signals from the remote control indicative of user-actuation of the pointing device and communicate such to the at least one processor.

10. The method of claim 7 wherein the predetermined interval is approximately 1 second.

11. The method of claim 7 wherein the at least one media gateway appliance further comprises at least one memory adapted to store information defining the predetermined interval.

* * * * *